United States Patent [19]

Link

[11] Patent Number: 4,834,424
[45] Date of Patent: May 30, 1989

[54] LIFT TRUCK

[75] Inventor: David H. Link, Battle Creek, Mich.

[73] Assignee: Clark Equipment Company, South Bend, Ind.

[21] Appl. No.: 229,261

[22] Filed: Aug. 8, 1988

Related U.S. Application Data

[62] Division of Ser. No. 918,957, Oct. 15, 1986.

[51] Int. Cl.⁴ ............................................. B62D 21/12
[52] U.S. Cl. ..................................... 280/785; 180/68.5
[58] Field of Search .............. 280/785; 29/430, 469.5; 296/196, 197; 180/312, 68.5

[56] References Cited

U.S. PATENT DOCUMENTS

| | | | |
|---|---|---|---|
| 3,367,441 | 2/1968 | Schuster et al. | 180/68.5 |
| 3,497,090 | 2/1970 | Daniels | 180/68.5 X |
| 3,721,353 | 3/1973 | Erickson | 180/68.5 |
| 3,838,745 | 10/1974 | Kappel | 180/68.5 |
| 4,312,418 | 1/1982 | Rittman | 180/68.5 |
| 4,342,470 | 8/1982 | Matsuda | 280/785 |
| 4,711,467 | 12/1987 | Link et al. | 280/785 |

Primary Examiner—Charlie T. Moon
Attorney, Agent, or Firm—John C. Wiessler

[57] ABSTRACT

A material handling truck utilizing a battery box on which a plurality of truck components and controls are sub-assembled in a location different from a main frame assembly station or stations, which battery box is then transported to an assembly line station at which it is secured to the main frame of the truck, the sub-assembled components and controls being then suitably connected to other truck components and controls previously assembled in the main frame to form a truck chassis. The truck assembly is then completed by mounting on one end of the battery box a counterweight assembly, and the other components such as an upright assembly, overhead guard and hood and seat assembly are mounted on the truck. At final assembly the lift truck is adapted to receive a drive or traction battery in the battery box, the latter functioning as a structural subframe assembly of the truck. The battery box may be readily removed from the truck chassis in use to facilitate servicing of components and controls mounted thereon, as well as to facilitate servicing of components and controls mounted on the main frame. The foregoing results in an improved lift truck structure.

8 Claims, 5 Drawing Sheets

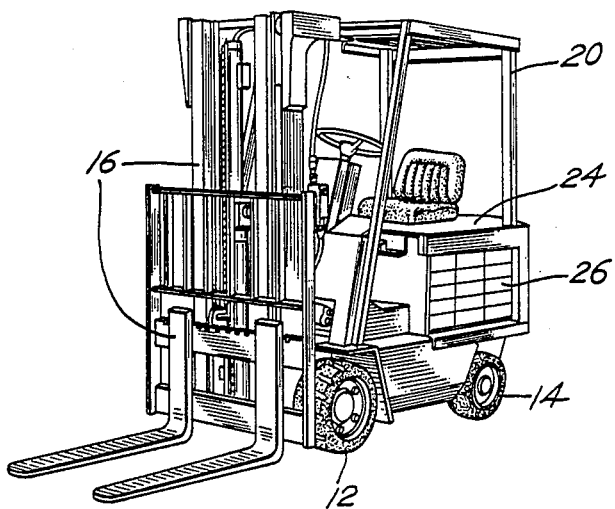
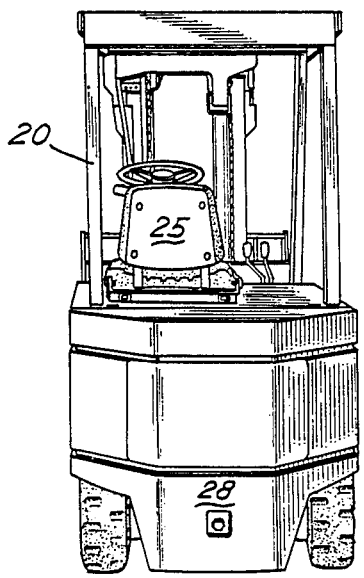
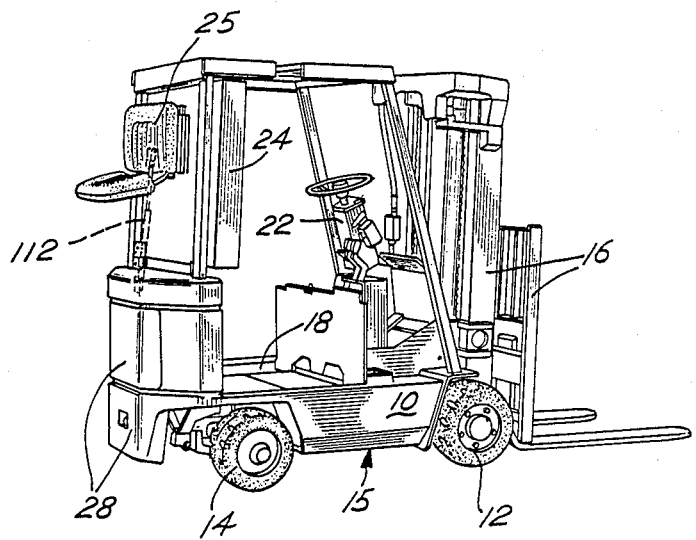

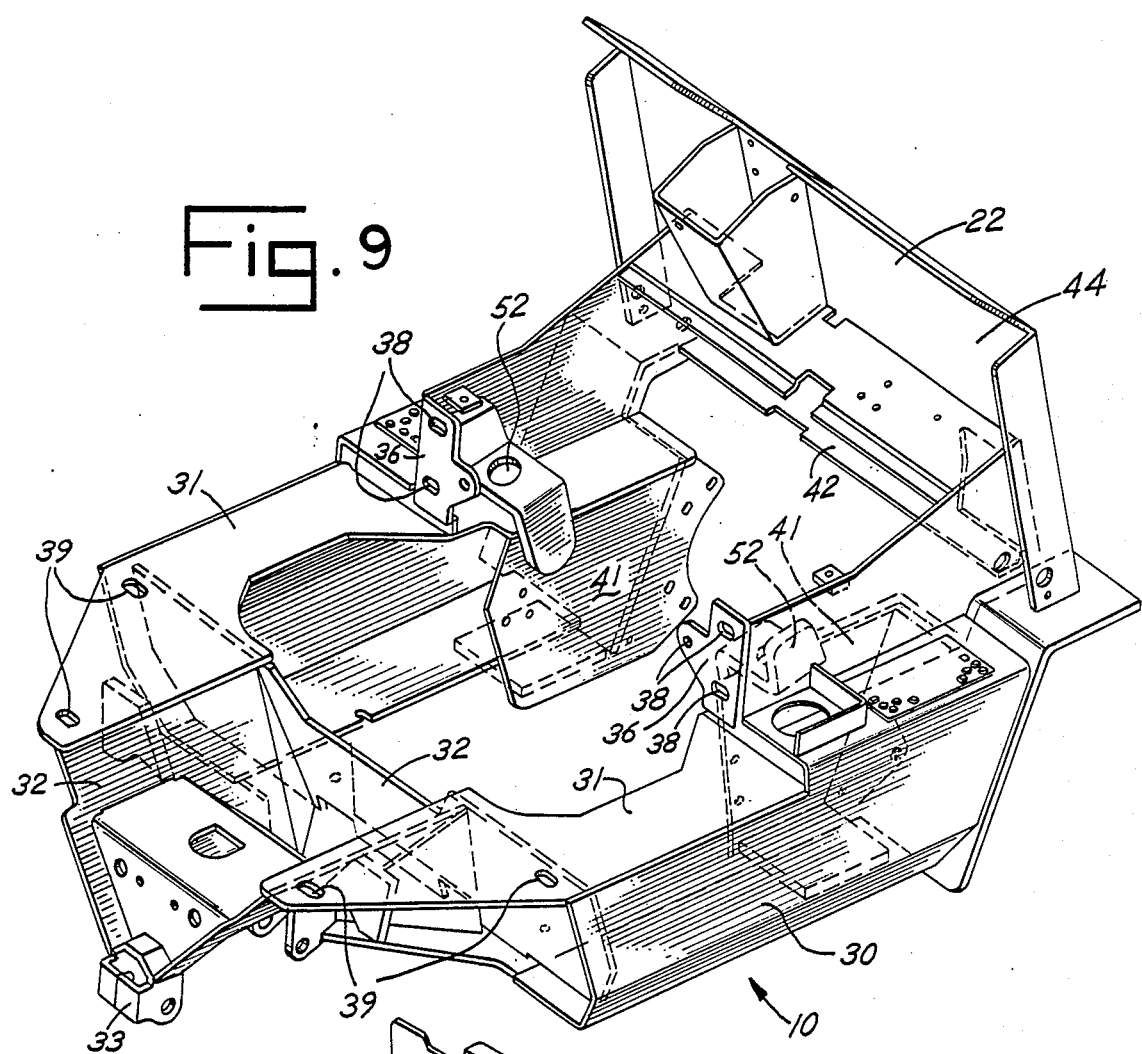
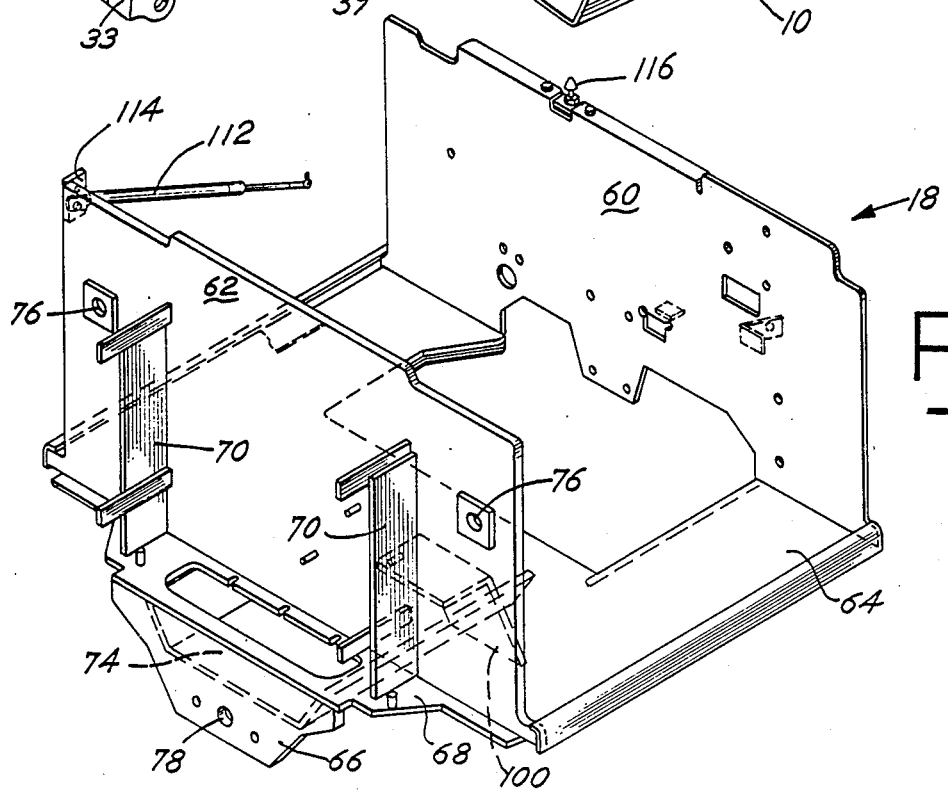

LIFT TRUCK

CROSS-REFERENCE TO RELATED APPLICATION

This is a division of U.S. patent application Ser. No. 918,957, filed Oct. 15, 1986.

BACKGROUND OF THE INVENTION

Heretofore in the manufacture of materials handling trucks, such as lift trucks, particularly of the sit-down rider type, it has been customary to first construct an all-welded rigid frame in and on which along a relatively long assembly line numerous operating components including electrical and hydraulic systems are assembled, which together produce at the end of the line an operable truck.

As is common in such assembly operations one or more components are mounted in and on the all welded frame at each of many stations along the assembly line and interconnected as required as by electrical cables and hydraulic conduits to effect an operable vehicle.

In the case of sit-down electric lift trucks all components required to effect an operable vehicle are assembled on the frame as it traverses the assembly line, excepting only the main drive or traction battery which is ordinarily installed at the customer's location because of the weight and bulk of the battery which otherwise would have to be shipped with the truck. Assembly line test batteries may be installed at the end of the line during inspection and testing of the operation of the truck. After market servicing of such trucks has been relatively difficult because of the compact packaging of components on the frame.

My invention is particularly adapted for use with four-wheel electric sit-down rider lift trucks. A related invention, of which I am a joint inventor, is disclosed in U.S. Pat. No. 4,711,467, common assignee.

SUMMARY OF THE INVENTION

The principal object of the present invention is to provide improved lift truck structure, the method of manufacture and assembly of which significantly reduces the time and space required for assembly of lift trucks by performing sub-assembly of a number of major truck components and controls on a battery box at a location different from the main frame assembly line or station, transporting the battery box assembly to a certain station of the assembly line, and mounting it to the truck frame on which other truck components have been pre-assembled.

In an electric lift truck, for example, the mounted battery box doubles both as a structural assembly of the truck frame and as a battery retainer, and on which is pre-assembled a plurality of truck components and controls. It is secured to the truck frame such as by bolts to hold it in rigid relationship thereto, except when servicing is required in the after-market. The battery box assembly may be readily dismounted from the truck frame for easy access and servicing of the components and controls mounted thereon and on the main frame, as well as being adaptable for receiving battery box assemblies of different sizes on the same main frame assembly for different truck operating requirements.

Depending on requirements it may be found that two assembly stations only are required; for example, one for main frame assembly and another for battery box assembly, which assemblies may be combined at the main frame assembly station.

Alternatively it may be found feasible to progress both the main frame and the battery box along an assembly line while assembling the various respective components with each and at a final assembly station mounting the now assembled battery box on the assembled main frame. In other words, a variety of assembly procedures are feasible depending upon manufacturing requirements, the foremost requisite being that the battery box sub-assembly is mounted on and assembled with the main frame assembly at a particular station in the assembly process.

From the foregoing it will be understood that by using my method of manufacture and assembly the conventional time and space required for assembly are both significantly reduced, and serviceability and access to truck components are greatly enhanced, resulting in an improved lift truck structure.

BRIEF DESCRIPTION OF THE DRAWINGS

FIG. 1 is a perspective front quarter view of the assembled lift truck with battery installed;

FIG. 2 is a rear perspective view of the truck of FIG. 1;

FIG. 3 is a perspective view of the assembled lift truck ready to receive a drive or traction battery in the battery box;

FIG. 9 is a rear quarter perspective view of the main frame;

FIG. 10 is a rear quarter perspective view of the battery box; and

DESCRIPTION OF THE PREFERRED EMBODIMENT

Figure 4:
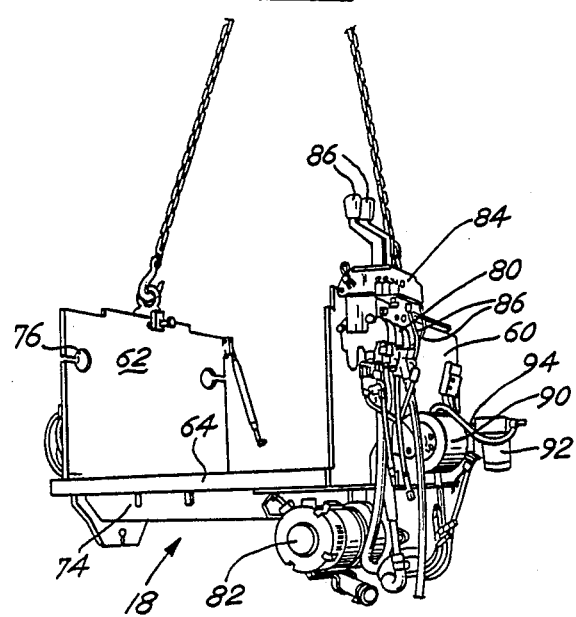
FIG. 4 is a perspective side view of a pre-assembled battery box with various components and controls mounted thereon ready for transport to an assembly line.

Referring first to FIGS. 1-3, a lift truck is shown having a main frame and a body construction 10 mounted on pairs of traction and steer wheels 12 and 14, respectively, which together with the drive train comprises a chassis 15. An upright and fork carriage assembly 16 is mounted at the forward end of the chassis, a sub-assembly battery box and controls assembly 18 mounted in the central section of the lift truck, and an overhead guard assembly 20, operator's steering wheel and pylon 22, and a rearwardly pivotable box-like hood device 24 having mounted thereon an operator's seat 25 are mounted as shown. A drive or traction battery 26 is adapted to be installed in the battery box and a counterweight assembly 28 is mounted from the rear of the truck. It will be understood that batter 26 also provides a source of energy for all electrically operated components, such as the lift and steer pump motors, in addition to providing the energy source for the electric drive motor of the truck.

Figure 5:
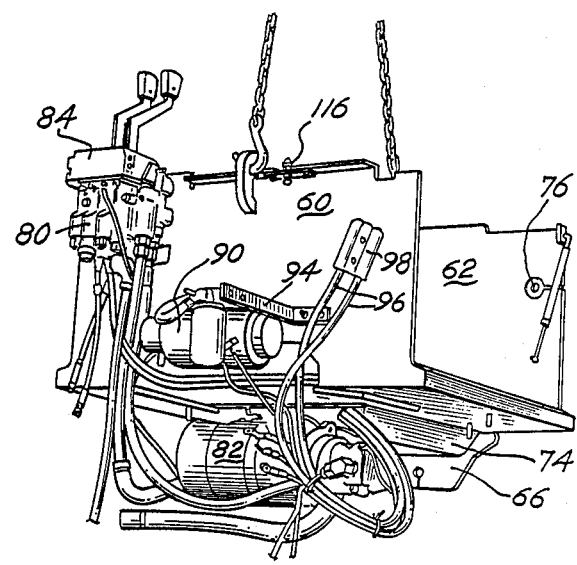
FIG. 5 is a front-quarter perspective view of the assembly shown in FIG. 4.
Figure 6:
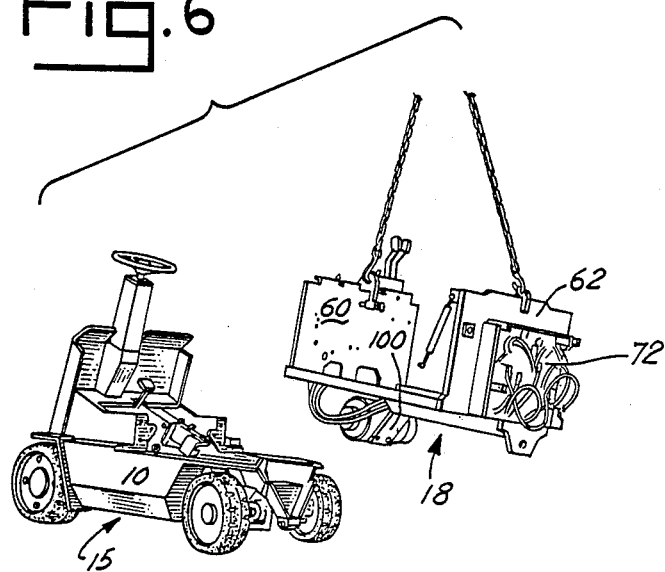
FIG. 6 is a perspective view of the lift truck chassis in position to receive the assembled battery and controls box.
Figure 8:
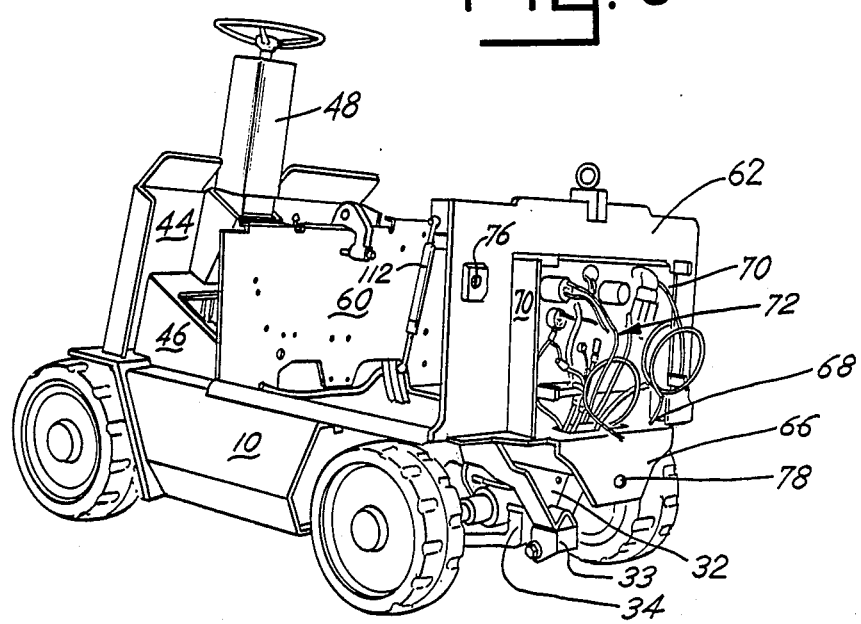
FIG. 8 is a rear quarter perspective view of the assembled lift truck chassis and battery and controls box.
Figure 7:
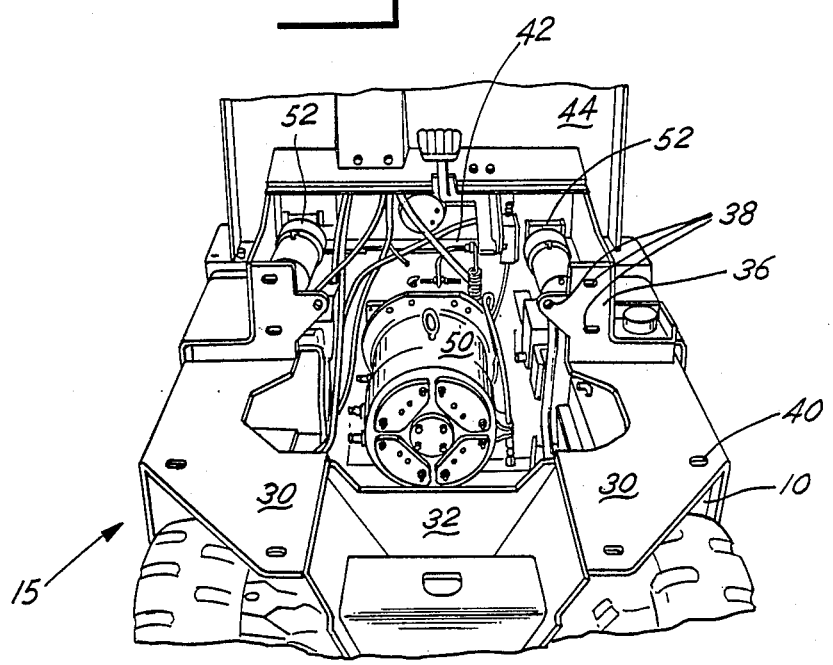
FIG. 7 is a rear perspective view of the lift truck chassis.

Referring now to FIGS. 4–10 the main frame 10 shown best in FIG. 9 is an all-welded construction which, when combined with the drive and steer wheels and associated drive line components, certain of which are shown in FIGS. 6 and 7, comprises chassis 15 of the lift truck. The frame comprises an all-welded configured construction as illustrated including side rail box frame members 30 welded to which are a pair of inwardly projecting configured top plate portions 31, a recessed drop box 32, which also serves as a main structural transverse frame member of generally inverted triangular shape in projection, welded at its upper leg edges to plates 31 and adapted to support in known manner from an apex portion 33 one side of a steer axle assembly 34, and upstanding brackets 36 forming bolt openings 38 which together with bolt openings 39 in plates 31 are adapted to secure the battery box assembly 18 at registrable bolt openings. One or both sides of box frame sections 30 may be sealed to provide hydraulic oil sumps for the hydraulic system which supplies various components such as the lift and tilt cylinders and steer pump. A unitary drive axle and traction motor is supported rigidly from a pair of spaced frame plates 41. Wells for the drive and steer wheels are formed as shown. A transverse structural rail 42 at the front of the frame is secured to the upper fender sections of the traction wheel wells, secured to and extending upwardly from which is a known configuration of a front protective plate portion 44. An open box-like cover portion 46 in the operator's compartment (FIG. 8) through which are adapted to project various operator's controls such as brake and accelerator pedals, and a steering pylon 48 functions as a cover and operator's floor section intermediate plate 44 and brackets 36. Other parts of frame 10 are as illustrated in FIG. 9.

The drive axle assembly, not shown, is of well known construction having rigidly mounted thereto an electric traction drive motor 50, the complete assembly of which is mounted in known manner to the front of the truck frame at the arcuate sections of frame plates 41, the drive motor being cantilevered to extend longitudinally and rearwardly of the drive axle in the open center section of the main frame (FIG. 7). Upright assembly 16 is bearing mounted in known manner from the drive axle arms and is connected to the rame by tilt cylinders which are anchored to the frame at pairs of pivot connection openings 52.

The battery box 18 (FIG. 10) comprises a three-sided welded construction having upstanding forward and rearward transverse plate members 60 and 62 forming with a bottom connecting plate 64 a side-to-side open compartment for receiving the drive or traction battery 26 (FIG. 1), a plurality of suitable openings in plates 60 and 64, as shown, being adapted to register with openings 38 and 39 in the main frame for rigidly connecting the battery box with the frame, as by bolts, and thereby forming further rigid transverse structural frame members with the main frame. A counterweight support bracket 66 is welded to a rearwardly extending plate portion 68, in turn welded to plate 62 and to a pair of spaced vertical plates 70 forming with plate 68 a recessed area to the rear of plate 62 for receiving an assembly of SCR controls 72. Welded to the inner face of bracket 66 and to the underside of bottom plate 64 is a longitudinally extending channel 74 for the routing and protection of cables and wires connecting the SCR control 72 to various operating components of the lift truck including the battery, traction motor and other components. Channel 74 at the time of assembly of the battery box to the main frame is received in the main frame opening rearwardly of the traction motor 50 and extends rearwardly through the recess formed by drop box 32. A pair of transversely spaced openings 76 in plate 62 combine with an opening 78 in bracket 66 to support the upper and lower counterweight assembly 28 at the time of assembly of the counterweight with the battery box assembly subsequent to the mounting of the latter on the main frame. An interior open section in the counterweight, not shown, houses and protects the exposed portion of the SCR control. Although the latter construction is preferred it will be understood that alternatively the SCR control can be mounted and housed in the interior open section of the counterweight.

Mounted at the forward end of the battery box to plates 60 and 64 are a plurality of truck operating components, best shown in FIGS. 4 and 5. On the front surface at the upper end of plate 60 is mounted a main hydraulic valve assembly 80 connected to which are a plurality of flexible hydraulic conduits for coupling connection with the main lift cylinder of upright 16, a pair of upright tilt cylinders, not shown, and the lift pump of a lift pump and motor assembly 82 which is mounted from and transversely of the lower side of plate 64. The lift pump and motor assembly at the time of assembly of the battery box with the main frame nests transversely in the space between frame rails 30 and in a space provided between the rear end of traction motor 50 and the vertical plate of recess drop box 32. Mounted on top of valve assembly 80 and secured thereto is an operator's valve control assembly 84 having valve levers 86 for controlling the operation of the pump and motor assembly 82, and the upright lift and tilt cylinders. Electric lines 86 connect the lever assembly 84 to the lift motor via a main wire harness for operating the lift pump and motor assembly. A steer pump and motor assembly 90 is suitably mounted at the lower front central portion of plate 60, a plurality of flexible conduits connecting the pump portion thereof to the power steering cylinder of wheels 14 via channel 74, and the motor portion thereof to the steering control in pylon 48 for driver control by the steer wheel subsequent to mounting the battery box on the main frame. A return line oil filter 92 is supported forwardly of the pump motor assembly 90 from a forward extending bracket 94 which is bolted to plate 60. Power cables 96, being connected to a battery connector 98 on plate 60 at the one ends, extend through the channel guide 74 to connect to the SCR control at the other ends. With the battery installed battery cables, not shown, are adapted to be connected to the traction motor. The lift motor and pump assembly 82 is supported from a bracket 100 which is connected to bottom plate 64 (FIG. 6).

The specific identification and routing of all of the power and electrical cables and hydraulic conduits which are connected to and between the plurality of components of the lift truck both mounted on the battery box and on and in the main frame, have not been specifically described herein inasmuch as a person skilled in the art will readily understand how such conduits, cables, and the like may be installed and connected. The independent installation on the main frame and battery box of the various cables and conduits allows optimization of routings and connections while maximizing access to them and protectibility of them.

The particular components disclosed as mounted on the main frame and on the battery box are for illustrative purposes only inasmuch as the particular components and arrangement thereof may be optional with the manufacturer depending upon the specifics of each truck design.

An exemplary assembly process in the manufacture of lift trucks utilizing my invention may be as follows:

In one process a main frame structure having been previously welded up is first located at one end of an assembly line at the first station of which the drive motor and axle assembly, as well as electrical cables and harnesses therefor, are assembled in the forward end of the frame. This assembly includes traction motor 50, a drive axle, and related parts. At subsequent stations a plurality of additional components are assembled on or in the main frame including power steering components and steer wheels, the drive wheels, operator pedal controls, steering wheel and drive controls in the pylon 48, upright tilt cylinders, and the like.

During or prior to the above assembly process it has been found convenient to mount on the battery box, which has been previously welded up at one or more stations remote from the main assembly line, the various components described above in respect of FIGS. 4, 5, 6 and 8. If desired such components may be tested conveniently at the remote assembly station, as by bench test, prior to the transporting thereof, such as by an overhead crane, to a selected station on the main assembly line at which the battery box and assembled components is mounted in the main frame in position to be rigidly secured thereto by insertion of a plurality of mounting bolts through the now registered openings in the front and bottom plates of the battery box and in the main frame as previously described. The various hydraulic and electric conduits associated with the components mounted on the battery box are at this time preferably connected to the respective truck operating components.

Subsequent to the mounting of the battery box in the main frame additional truck parts and components are assembled at subsequent stations, such as the counterweight 28 and the necessary plugs and cables for connection to a test drive battery which may be installed for subsequent functional testing of the various hydraulic and electrical components prior to shipment of the truck. The upright assembly 16 may then be installed, after which the hood and seat assembly 24,25 and the overhead guard are installed. Battery 110 is normally installed at a later time, such as at a distributor's or end user's location following shipment of the truck so as to avoid the weight and bulk of shipment thereof from the factory.

The front and rear pairs of support legs of the overhead guard are secured in known manner to the front portion of the main frame and to the counterweight respectively, as shown in FIG. 3. Brackets 110 (FIG. 11) are adapted to secure the hood and seat assembly to the rear legs of the overhead guard. A gas charged cylinder 112 is connected by a bracket 114 to the one side of plate 62 and is adapted to be connected at the rod end to a bracket, not shown, of the horizontal under surface of the hood. A hood latch device of known design comprises a stud bolt 116 secured suitably to the upper edge portion of plate 60 (FIG. 10) which is adapted to latch in down position the hood when a cooperating latch member, not shown, mounted from the underside of the hood slides over and engages the stud bolt when the hood is lowered. U.S. Pat. No. 3,976,157 discloses a hood latch device which is suitable in principle to be used with my invention.

Gas cylinder 112 is preferably precharged so that when connected to the hood it holds the hood in a slightly raised position. When the hood is latched to stud bolt 116 by pushing it down against the gas cylinder it thus becomes a rigid subassembly of the battery box and functions as an upper frame portion thereof. The gas cylinder assists the operator by reducing the effort required both in raising and lowering the hood.

It will be understood that it is optional in the assembly process, depending on the truck design, to assemble and mount on the main frame components such as the overhead guard, the hood and seat assembly and the counterweight, or to preassemble said above components on the battery box prior to assembly of the latter on the main frame. The preassembly of the battery box which includes the assembly thereon of the overhead guard, the hood and seat assembly, and the counterweight is preferred so that at a single station the essential two halves of the complete truck are assembled with the upright being mounted subsequently.

Figure 11:
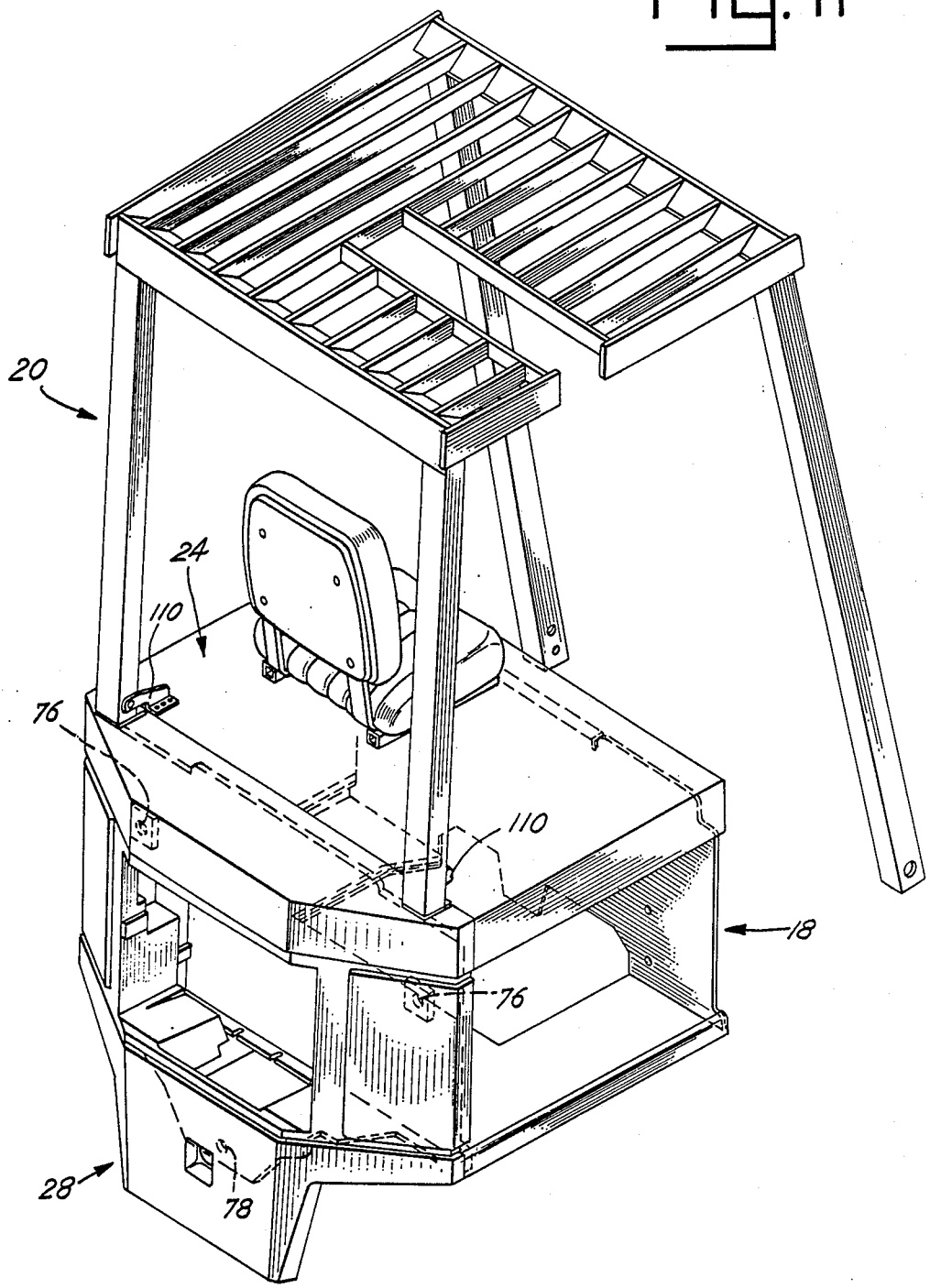
FIG. 11 is a perspective view of a modified embodiment of my invention.

FIG. 11 illustrates somewhat schematically the preassembly of the counterweight, hood and seat assembly and overhead guard on the battery box assembly.

It will also be understood that, depending on the particular truck design, factory space, and the like, the two stations only, for example, may be required for complete truck assembly; viz, one for complete main frame assembly and another for battery box assembly, the two sub-assemblies being assembled at one of the stations to provide a complete lift truck. Alternatively the assembly process may, for example, be accomplished by "follow-the-leader" assembly wherein the main frame assembly is performed at one or more stations with the battery box assembly following behind the main frame, and upon completion of both assemblies the battery box is lifted and move onto the main frame for mounting thereon.

The above alternative exemplary assembly processes of my invention have been found to eliminate many assembly stations and speed up the assembly process by pre-assembly or concurrent assembly of the battery box and components for installation of the latter on the main frame at a single station. In addition the process affords the opportunity to inspect and bench test the components mounted on the battery box prior to assembly in the truck frame, as well as to inspect and test the components mounted in the main frame while there is open access thereto prior to assembly of the battery box on the main frame.

It should also be understood that battery box size may be altered to suit requirements. For example, customers may specify battery box size desired from the battery power requirements of different applications whereby battery box specifications may be altered to a variety of custom requirements while utilizing the same main frame.

My invention significantly reduces the cost and time and space requirements for lift truck assembly. It further has the important after-market advantage of providing easy access to most major truck components by providing for the ready removal, if required, of the battery box and assembled components so as to "open up" the main frame and its assembled components while at the same time providing for removal of the battery box to a convenient location for servicing any components assembled thereon. Thus, easy access for the subsequent servicing and replacement of various components as may be required is provided. All of the foregoing results in my improved lift truck structure.

Although I have described and illustrated a preferred embodiment of my invention, it will be understood by those skilled in the art that modifications may be made in the structure, form and relative arrangement of parts without departing from the spirit and scope of the invention. Accordingly it should be understood that I intend to cover by the appended claims all such modifications which fall within the scope of my invention.

I claim:

1. A lift truck comprising a main frame having mounted thereon a traction drive unit assembly, a battery box means adapted to receive a traction drive battery adapted to be rigidly connected to the main frame and detachable therefrom as a unit, said battery box means providing traction drive battery retainer means, said battery box means when in rigid connected relationship to the main frame functioning as a structural means of said main frame, and a plurality of components including one or more pump and motor assemblies assembled on the battery box means which when detached from the main frame provide ready access for servicing of those components including one or more pump and motor assemblies mounted on the battery box means as well as ready access for servicing components mounted in the main frame.

2. A lift truck as claimed in claim 1 wherein components mounted on said battery box means include a lift pump and motor assembly, a steer pump and motor assembly, and a control valve assembly.

3. A lift truck as claimed in claim 1 wherein said traction drive unit is mounted from front traction axle means and extends rearwardly and longitudinally into a central open space of the main frame, one of said motor and pump assemblies being secured to the bottom side of the battery box means and extending transversely and rearwardly of the traction drive unit in the open space of the main frame.

4. A lift truck as claimed in claim 1 wherein longitudinally extending channel means for routing and protection of cable means is secured to the bottom portion of the battery box means.

5. A lift truck as claimed in claim 1 wherein a drive battery as mounted in the battery box means which provides battery retainer means, said battery box means when in rigid connected relationship to the main frame functioning as a structural means of said main frame.

6. A lift truck as claimed in claim 1 wherein said plurality of components include an overhead guard, and a hood and seat assembly.

7. A lift truck as claimed in claim 6 wherein said hood and seat assembly is adapted to be latched in a rigid down position by a gas cylinder which connects the battery box means to the hood and a latch means which connects the forward end of the hood to the battery box means.

8. A lift truck as claimed in claim 7 wherein said hood functions as a frame member of said battery box means when latched in down position.

* * * * *